(12) United States Patent
Stadler et al.

(10) Patent No.: US 9,902,500 B2
(45) Date of Patent: Feb. 27, 2018

(54) AIRCRAFT WITH AN ENGINE HAVING A BY-PASS AIR INLET OPENING AND A BLEED AIR OUTLET

(71) Applicant: AIRBUS HELICOPTERS DEUTSCHLAND GMBH, Donauworth (DE)

(72) Inventors: Michael Stadler, Donauworth (DE); Ralf Braeutigam, Tapfheim (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 337 days.

(21) Appl. No.: 14/730,367

(22) Filed: Jun. 4, 2015

(65) Prior Publication Data
US 2015/0367945 A1   Dec. 24, 2015

(30) Foreign Application Priority Data
Jun. 19, 2014   (EP) .................................... 14400038

(51) Int. Cl.
*B64D 27/10* (2006.01)
*B64D 33/02* (2006.01)
(Continued)

(52) U.S. Cl.
CPC ............. *B64D 27/10* (2013.01); *B64D 33/02* (2013.01); *B64D 33/04* (2013.01); *F02C 6/08* (2013.01);
(Continued)

(58) Field of Classification Search
CPC ........ B64D 27/10; B64D 33/02; B64D 33/04; F02C 6/08; F02C 7/055; F02C 7/057; F02C 9/18
(Continued)

(56) References Cited

U.S. PATENT DOCUMENTS 2,385,366 A * 9/1945 Lysholm ................. F02C 3/055
                                                    416/94
2,464,724 A * 3/1949 Sedille .................... F02C 6/206
                                                    416/20 R
(Continued)

FOREIGN PATENT DOCUMENTS

FR       1548724       12/1968
WO    2008016341        2/2008
WO    2008076471        6/2008

OTHER PUBLICATIONS

Extended European Search Report for EP 14400038.7, Completed by the European Patent Office, dated Jan. 7, 2015, 4 Pages.

*Primary Examiner* — Richard R Green
*Assistant Examiner* — Brady W Frazier
(74) *Attorney, Agent, or Firm* — Brooks Kushman P.C.

(57) ABSTRACT

An aircraft having at least one first and one second engine, each engine comprising a main air inlet opening, a by-pass air inlet opening and a bleed air outlet, said main air inlet opening being provided with an inlet barrier filter for filtering a main air stream through said main air inlet opening into the engine, said by-pass air inlet opening being provided with a by-pass door that is operable by an associated operating element to enable a by-pass air stream through said by-pass air inlet opening into the engine, and said bleed air outlet being provided for creating an outgoing bleed air stream going out of the engine in operation, at least one associated operating element being controllable by an outgoing bleed air stream.

15 Claims, 2 Drawing Sheets

(51) Int. Cl.
    *B64D 33/04*     (2006.01)
    *F02C 6/08*     (2006.01)
    *F02C 7/055*     (2006.01)
    *F02C 7/057*     (2006.01)
    *F02C 9/18*     (2006.01)

(52) U.S. Cl.
    CPC .............. *F02C 7/055* (2013.01); *F02C 7/057* (2013.01); *F02C 9/18* (2013.01); *B64D 2033/0246* (2013.01); *F05D 2220/329* (2013.01); *F05D 2270/093* (2013.01); *F05D 2270/46* (2013.01); *F05D 2270/65* (2013.01)

(58) Field of Classification Search
    USPC ....................................................... 244/53 R
    See application file for complete search history.

(56) References Cited

U.S. PATENT DOCUMENTS

| | | | | |
|---|---|---|---|---|
| 3,108,767 A | * | 10/1963 | Eltis | ........................ F02K 1/08 244/203 |
| 3,411,272 A | | 11/1968 | Carmon | |
| 3,421,296 A | * | 1/1969 | Beurer, Sr. | ............. B64D 33/02 209/710 |
| 4,250,703 A | | 2/1981 | Norris et al. | |
| 4,329,114 A | * | 5/1982 | Johnston | ................. F01D 11/24 415/116 |
| 5,540,252 A | * | 7/1996 | Bruun | ................... G05D 7/0146 137/220 |
| 5,662,292 A | * | 9/1997 | Greene | ................... B64D 33/02 244/53 B |
| 5,845,482 A | * | 12/1998 | Carscallen | ............ F01D 17/105 60/226.3 |
| 6,152,978 A | * | 11/2000 | Lundquist | .............. B01D 39/12 55/385.1 |
| 2005/0229558 A1 | | 10/2005 | Stelzer et al. | |
| 2007/0025838 A1 | | 2/2007 | Stelzer | |
| 2007/0130912 A1 | * | 6/2007 | Kraft | ......................... F02C 6/08 60/226.1 |
| 2007/0261410 A1 | * | 11/2007 | Frank | .................... F01D 17/105 60/785 |
| 2013/0092798 A1 | | 4/2013 | Boyce | |

\* cited by examiner

AIRCRAFT WITH AN ENGINE HAVING A BY-PASS AIR INLET OPENING AND A BLEED AIR OUTLET

CROSS REFERENCE TO RELATED APPLICATION

This application claims priority to European patent application No. EP 14 400038.7 filed on Jun. 19, 2014, the disclosure of which is incorporated in its entirety by reference herein.

BACKGROUND OF THE INVENTION (1) Field of the Invention

The invention is related to an aircraft having at least one first and one second engine, each engine comprising a main air inlet opening, a by-pass air inlet opening and a bleed air outlet, said aircraft comprising the features of claim 1.

(2) Description of Related Art

Main air inlet openings of engines in aircrafts and, more particularly, of gas turbine engines in aircrafts, such as e.g. turbo-shaft engines in rotary wing aircrafts, are frequently provided with inlet barrier filter systems comprising air filtration devices that are arranged in the main air paths of the engines for filtering main air streams through the main air inlet openings into the engines. Such inlet barrier filter systems offer a very effective possibility for protecting the engines. However, they are exposed to multiple different operating and background conditions, which may amongst others lead to a clogging of the air filtration devices after a certain time of operation. If this happens during flight operation, a respective power provided by an affected engine could potentially be decreased to an extent where the necessary power to safely continue operation would not be guaranteed any more.

Accordingly, there are strict regulations for certification of inlet barrier filter systems, e.g. especially for so-called CAT A capable helicopters, i.e. helicopters corresponding to the category A definition of the EASA Comment Response Document CRD b.2 Annex I, which may lead to operational limitations for such helicopters. Therefore, already for certification purposes, the inlet barrier filter systems of such helicopters and, more generally, the inlet barrier filter systems on gas turbine engines of aircrafts in general, are provided with by-pass air systems that are adapted to feed the engines with air whenever a clogging of corresponding air filtration devices of the inlet barrier filter systems occurs during flight operation.

In general, a by-pass air system of a gas turbine engine defines a secondary air path of the engine, which is realized without any air filtration device. More specifically, a by-pass air system of a gas turbine engine usually consists of a by-pass air inlet opening that is provided with a by-pass door, which is operable by an associated operating element, i.e. can be opened if required to enable a by-pass air stream through the by-pass air inlet opening into the engine.

The above described by-pass air and main air inlet openings define air intake systems. However, gas turbine engines of aircrafts can also be provided with air outlet systems by means of so-called bleed air outlets for creating an outgoing bleed air stream going out of the engine in operation. Such bleed air outlets are generally arranged downstream of compressor stages of the gas turbine engines, which are upstream of their respective fuel burning sections, so that compressed air, the so-called "bleed air", can be derived from the gas turbine engines to form the outgoing bleed air stream. This outgoing bleed air stream can advantageously be used e.g. for cross-starting another engine, cabin pressurization, airframe and engine anti-icing, air conditioning and so on.

The document US 2007/0025838 A1 describes an aircraft and, more particularly, a helicopter having a gas turbine engine that is provided with an air induction system. The air induction system is provided with a housing having four openings that comprise primary entryways for receiving air and are located on top and lateral surfaces of the housing. A flat filter panel with a porous filter media is mounted across each opening to define an inlet barrier filter system. The housing further comprises two hollow extensions, each having an opening that, in turn, comprises a by-pass opening for receiving intake air into the housing that supplements or replaces primary intake air received through the flat filter panels. A hinged door covers each by-pass opening and is controllably rotatable by a motorized actuator between a closed position, wherein the by-pass opening is closed, and an open position, wherein intake air may enter the housing through the by-pass opening. The motorized actuator is implemented as an electromechanical actuator.

The document WO 2008/016341 A2 describes an aircraft and, more particularly, a helicopter having a gas turbine engine that is also provided with an air induction system. The air induction system includes a cowling and a filtering unit that is generally enclosed within the cowling. The filtering unit comprises two barrier filter panels with pleated, porous barrier filter elements that are provided with filter media, such as cotton grid fabric, and arranged in a main air intake path for filtering main air streams prior to intake into the engines. The air induction system is further provided with one or more by-pass openings that are covered by associated hinged by-pass doors. Each hinged by-pass door is opened and closed by an actuator that is implemented as an electromechanical actuator.

The document WO 2008/076471 A2 describes an inlet barrier filter system for an aircraft engine, which includes a filter panel with a filter media for filtering a main air stream prior to intake into the engine. The filter panel can be pivoted by means of an associated actuator to form a by-pass air inlet opening, such that air is allowed to bypass the filter panel for streaming via said by-pass air inlet opening into the engine. In other words, the filter panel itself implements the by-pass door of the by-pass air inlet opening. The actuator is implemented as an electromechanical actuator.

The document FR 1 548 724 A1 describes an aircraft and, more particularly, a helicopter having an aircraft engine with an inlet barrier filter system and a by-pass air system. The inlet barrier filter system comprises filter panels for filtering a main air stream prior to intake into the engine and the by-pass air system is provided with by-pass doors that cover associated by-pass air inlet openings. Alternatively, the filter panels can be pivoted to create the by-pass air inlet openings such that air is allowed to bypass the filter panels for streaming via said by-pass air inlet openings into the engine. The filter panels or the by-pass doors can be pivoted by means of associated actuators that are implemented as electrical or hydraulic actuators.

The document US 2013/0092798 A1 describes an aircraft and, more particularly, a helicopter having an aircraft engine that may include a turbine engine, a piston engine, or another type of engine suitable for generating rotation of associated rotor blades, in order to provide thrust for the aircraft. The aircraft engine includes two intakes for receiving air flow for use by the aircraft engine in a combustion process. The helicopter includes two filter systems that are respectively coupled to an associated one of the intakes, such that intake air passes through the filter system prior to entering the air intake of the aircraft engine. Each filter system includes a by-pass closure, which is disposed adjacent to a filter assembly of the filter system. The by-pass closure is movable relative to the filter assembly between a first position, in which the by-pass closure covers and seals the by-pass opening of the filter assembly, and a second position, in which the by-pass closure is spaced apart from the filter assembly. The filter system further includes an actuator for causing relative movement of the by-pass closure between the first and second positions. This actuator may include an electrical actuator, a fluid actuator, a pneumatic actuator or another suitable device.

The document U.S. Pat. No. 3,411,272 describes a helicopter with a turbine engine having an air inlet that is positioned to receive air from an inlet compartment or plenum. The air inlet is provided with a pair of fixed side filter assemblies and a movable top filter assembly. The side filter assemblies are positionally fixed to constantly provide filtering action. The top filter assembly is of a louvered construction including a plurality of fixed louvers and a plurality of pivotably movable louvers having filters, which can be of a conventional construction to capture harmful dirt particles, while passage of air is permitted. The movable louvers cooperate with the stationary louvers in a closed position to completely close the air inlet through an upper portion of the inlet compartment. The movable louvers are pivotally mounted at their lower extremities about associated pivots. Thus, the movable louvers can be pivoted into a position, in which a passage through the top filter assembly is opened, so that air will pass freely there through while bypassing the filters of the louvers. Movement of the movable louvers can be provided by means of an actuator that can be implemented by a pneumatic piston assembly, which can be actuated by a 4-way pneumatic valve, which in turn is actuated by an electric solenoid. The actuation of the solenoid, and hence the pneumatic valve and the movable louvers, is controlled by electrical circuitry.

However, in all of the above-described barrier inlet filter and/or by-pass air systems, a cumulated time of failure detection in the case of a failure of the aircraft engine, or a One Engine Inoperative (OEI)-detection in the case of a failure of an aircraft engine of a multi-engine aircraft, and a subsequent activation of the above described actuators in order to fully open respective by-pass air inlet openings is comparatively long and can take up to six seconds. This applies particularly to electrical and/or electromechanical actuators, which usually further require provision of an associated harness system and additional electrical power supply systems, which makes the construction thereof comparatively complex.

More generally, all of the above-described barrier inlet filter and/or by-pass air systems use actuating systems that are, at least to some extent, electrically operated or activated, so that they require provision of electrical power supply systems. Such electrical power supply systems and the complexity of the respective actuating systems are, however, themselves potential sources of error and failure.

These drawbacks must be considered during construction of aircrafts with respect to flight and operation safety. They must further be considered with respect to certification of inlet barrier filter systems of aircrafts, especially with regard to the strict regulations for helicopters with the above mentioned capability for CAT A operation.

It is, therefore, an object of the present invention to provide an aircraft that comprises at least one first and one second engine, each engine comprising a main air inlet opening, a by-pass air inlet opening and a bleed air outlet, and that overcomes the above described drawbacks.

BRIEF SUMMARY OF THE INVENTION

According to the invention, an aircraft having at least one first and one second engine is provided, wherein each engine comprises a main air inlet opening, a by-pass air inlet opening and a bleed air outlet. The main air inlet opening is provided with an inlet barrier filter for filtering a main air stream through said main air inlet opening into the engine. The by-pass air inlet opening is provided with a by-pass door that is operable by an associated operating element to enable a by-pass air stream through said by-pass air inlet opening into the engine. The bleed air outlet is provided for creating an outgoing bleed air stream going out of the engine in operation. Furthermore, the associated operating element of the at least one first engine is connected to the bleed air outlet of the at least one second engine and controllable by the outgoing bleed air stream that goes out of the at least one second engine in operation, and the associated operating element of the at least one second engine is connected to the bleed air outlet of the at least one first engine and controllable by the outgoing bleed air stream that goes out of the at least one first engine in operation.

Preferably, the outgoing bleed air stream of the at least one first engine is used to keep the by-pass door of the at least one second engine closed and the outgoing bleed air stream of the at least one second engine is used to keep the by-pass door of the at least one first engine closed. Accordingly, if e.g. the at least one first engine fails, a corresponding pressure of the outgoing bleed air stream of the at least one first engine would abruptly decrease so that this outgoing bleed air stream could not keep the by-pass door of the at least one second engine closed any more. Thus, the by-pass door of the at least one second engine is opened so that the latter is operated in order to generate a maximally available power output. Similarly, if e.g. the at least one second engine fails, a corresponding pressure of the outgoing bleed air stream of the at least one second engine would abruptly decrease so that this outgoing bleed air stream could not keep the by-pass door of the at least one first engine closed any more. Thus, the by-pass door of the at least one first engine is opened so that the latter is operated in order to generate a maximally available power output.

Advantageously, the by-pass air system according to the invention has a simple mechanical/pneumatic construction that uses comparatively simple constituting components. Preferably, this by-pass air system does not require any electrical power supply, so that provision of an associated electrical power supply system and, thus, dedicated electrical wiring required for such an associated electrical power supply and control of corresponding, electrically controlled and driven actuators, can be omitted.

Preferably, the inventive by-pass air system functions by means of bleed air that is re-routed from the at least one first and second engines and used to drive associated pneumatic actuators that are adapted to generate motion that can be rotary or linear, depending on the type of actuator, e.g. rod cylinder type or rotary type actuator. More specifically, the inventive by-pass air systems of the at least one first and second engines preferably use pneumatic actuators and/or lamellar motors and/or pressure rod cylinder units that are driven by compressed air, i.e. bleed air that is re-routed from the at least one first and second engines themselves.

Bleed air is particularly advantageous and used on many aircraft systems, as it is easily available, reliable, and a potent source of power. For example, so-called air turbine starters that are used to start large gas turbine engines using bleed air can be designed much smaller and lighter than electric motors of equivalent power output. Furthermore, bleed air is available throughout the operating range of the engine from which it is re-routed and a bleed air outlet is serial standard for almost all gas turbine engines and, in particular, turbo-shaft engines that are intended for aeronautical application.

Advantageously, the inventive by-pass air system with pneumatic actuators has less latency time in transition, compared to e.g. a by-pass system with electrical actuators, due to a potential for very fast operation. Thus, the inventive by-pass air system puts less restrictions on aircrafts that are equipped therewith, in particular on helicopters that are intended for certification for CAT A operation.

According to one aspect of the invention, a by-pass door blocking system is provided that keeps the by-pass doors of the at least one first and second engines closed during cranking, i.e. starting of the engines. This can be useful in order to avoid foreign object damages of the at least one first and second engines during cranking.

According to a preferred embodiment of the invention, the associated operating element of the at least one first engine is configured to open the by-pass door of the at least one first engine in operation at least if a given clogging rate of the inlet barrier filter of the at least one second engine exceeds a predetermined threshold. Preferably, the associated operating element of the at least one second engine is configured to open the by-pass door of the at least one second engine in operation at least if a given clogging rate of the inlet barrier filter of the at least one first engine exceeds a predetermined threshold.

According to a further preferred embodiment of the invention, the associated operating element is a pneumatic actuator.

According to a further preferred embodiment of the invention, the associated operating element of the at least one first engine is connected to the bleed air outlet of the at least one second engine by means of a first connecting hose, and the associated operating element of the at least one second engine is connected to the bleed air outlet of the at least one first engine by means of a second connecting hose.

According to a further preferred embodiment of the invention, the associated operating element of the at least one first engine is connected to the bleed air outlet of the at least one second engine via a first associated air pressure accumulator, and the associated operating element of the at least one second engine is connected to the bleed air outlet of the at least one first engine via a second associated air pressure accumulator.

According to a further preferred embodiment of the invention, said pneumatic actuator is a rod cylinder type actuator or a rotary type actuator.

According to a further preferred embodiment of the invention, said by-pass door is spring-loaded by an associated spring element into an opened position and retained by said associated operating element in operation in a closed position.

According to a further preferred embodiment of the invention, said by-pass door is configured to remain in closed position, if said engine is inactive.

The present invention further provides an engine for an aircraft, comprising a main air inlet opening, a by-pass air inlet opening and a bleed air outlet. The main air inlet opening is provided with an inlet barrier filter for filtering a main air stream through said main air inlet opening into said engine. The by-pass air inlet opening is provided with a by-pass door that is operable by an associated operating element to enable a by-pass air stream through said by-pass air inlet opening into said engine. The bleed air outlet is provided for creating an outgoing bleed air stream going out of said engine in operation. Furthermore, the associated operating element is connected to said bleed air outlet and controllable by said outgoing bleed air stream in operation.

According to one aspect of the invention, the engine is a gas turbine engine having an upstream rotating compressor, a combustion chamber and a downstream turbine. The main air inlet opening with the inlet barrier filter and the by-pass air inlet opening are preferably arranged upstream of and/or radial to the upstream rotating compressor, and the bleed air outlet is preferably arranged downstream of said upstream rotating compressor, but still upstream of the combustion chamber. The bleed air outlet is preferentially configured to re-route a comparatively small part of compressed air generated by the upstream rotating compressor via pneumatic hoses to a pneumatic piston or rotary motor which is adapted to open the by-pass door, if required. The comparatively small part of re-routed compressed air defines the so-called bleed air and even conventional gas turbine engines are usually already equipped with relevant interfaces, so that there are advantageously no structural engine modifications required to allow use of the bleed air stream when conventional gas turbine engines are used to implement the present invention.

Preferably, the by-pass door is operated by an operating element that is implemented by means of pneumatic actuators, such as pneumatic motors or pressure cylinders, which will be driven by the bleed air stream. The pressure of the bleed air stream depends on a selected engine and can amount up to several hundred kPa, which can be matched with torque-output characteristic curves of readily available pneumatic actuators, so that conventional pneumatic actuators can advantageously be used when implementing the present invention. However, as the air temperature after the compressor stage, i.e. of the re-routed compressed air is roughly 250-300° Celsius depending on a selected engine, the pneumatic actuators need adequate sealing and housing.

According to one aspect of the invention, the bleed air outlet of the engine is connected with a hose to the pneumatic actuator, which will drive the by-pass door. The by-pass door, or alternatively a by-pass flap, is preferentially opened when the inlet barrier filter is getting clogged or in case of an engine fire.

Preferably, the pneumatic actuator is adapted to open and close the by-pass door, so that an underlying pneumatic mechanism has to be convertible. For instance, so-called double-acting cylinders in rotating or piston design that use the force of the bleed air to move in both extends and retract strokes can be used therefore. Suitable conventional double-acting cylinders are readily available and can advantageously be used without requiring structural modifications. Preferentially, a multi-port-valve can be used to manage the air flow to/from the pneumatic actuator, so that the by-pass door can be opened and closed as required.

According to a preferred embodiment of the invention, said associated operating element is configured to open said by-pass door in operation at least if a given clogging rate of said inlet barrier filter exceeds a predetermined threshold.

According to a further preferred embodiment of the invention, said associated operating element is a pneumatic actuator.

According to a further preferred embodiment of the invention, said associated operating element is connected to said bleed air outlet by means of a connecting hose.

According to a further preferred embodiment of the invention, said associated operating element is connected to said bleed air outlet via an associated air pressure accumulator.

According to a further preferred embodiment of the invention, said pneumatic actuator is a rod cylinder type actuator or a rotary type actuator.

According to a further preferred embodiment of the invention, said by-pass door is spring-loaded by an associated spring element into an opened position and retained by said associated operating element in operation in a closed position.

According to a further preferred embodiment of the invention, said by-pass door is configured to remain in closed position, if said engine is inactive.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference sign and are, consequently, only described once in the following description.

DETAILED DESCRIPTION OF THE INVENTION

Figure 1:
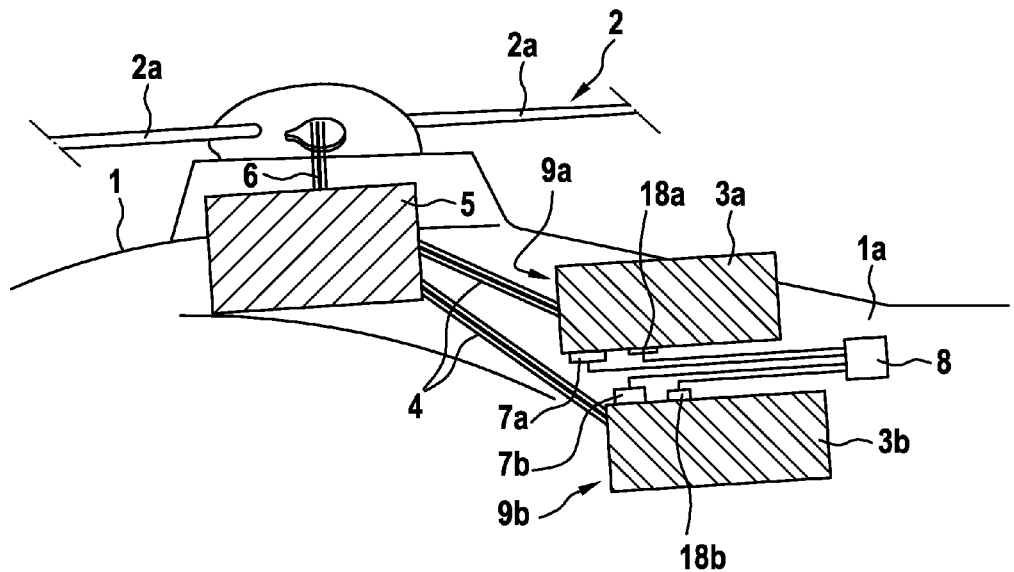
FIG. 1 shows a schematic view of an aircraft with a crossed by-pass air intake device control system according to a first embodiment of the invention.

FIG. 1 shows an aircraft 1 with a fuselage 1a according to the invention. The aircraft 1 is preferentially equipped with at least one and, illustratively, two aircraft engines 3a, 3b. These two aircraft engines 3a, 3b are preferably embodied, and hereinafter referred to, as gas turbine engines with associated main air inlet openings 9a, 9b, by-pass air intake devices 7a, 7b and bleed air outlets 18a, 18b, respectively.

According to one aspect of the invention, the aircraft 1 is a rotary wing aircraft having rotary wings 2a, and the two gas turbine engines 3a, 3b are adapted to drive one or more associated power consumer units 2 that are illustratively defined by the rotary wings 2a. More specifically, the rotary wings 2a are propelled by a propulsion system that comprises the two gas turbine engines 3a, 3b, which are in this case e.g. implemented as turbo-shaft engines. Each one of the gas turbine engines 3a, 3b is connected via an input interface 4, such as a mechanical shaft 4, hydraulic and/or electric means to a main gearbox 5. The main gearbox 5 transmits the power received from the gas turbine engines 3a, 3b via an output interface, such as a power consumer shaft 8, to the rotary wings 2a in order to propel the latter.

However, it should be noted that the present invention is not limited to rotary wing aircrafts. Instead, the present invention can be applied to any aircraft that comprises gas turbine engines with associated main air inlet openings, by-pass air intake devices and bleed air outlets.

According to one embodiment of the invention, the aircraft 1 comprises a by-pass air intake device control system 8 that interconnects the by-pass air intake devices 7a, 7b and the bleed air outlets 18a, 18b of the gas turbine engines 3a, 3b. Preferably, the by-pass air intake device control system 8 defines a crossed configuration, wherein the by-pass air intake device 7a of the gas turbine engine 3a is interconnected with the bleed air outlet 18b of the gas turbine engine 3b, and wherein the by-pass air intake device 7b of the gas turbine engine 3b is interconnected with the bleed air outlet 18a of the gas turbine engine 3a. The by-pass air intake device control system 8 is, therefore, also referred to as the "crossed by-pass air intake device control system 8", for clarity.

The crossed by-pass air intake device control system 8 is described in more detail below with reference to FIG. 3. However, it should be noted that the invention is not limited to such a crossed by-pass air intake device control system 8 that interconnects the two gas turbine engines 3a, 3b in crossed configuration, but may, instead, also be implemented for each one of the gas turbine engines 3a, 3b separately in the form of an in-line configuration by means of an in-line by-pass air intake device control system, as described in the following with reference to FIG. 2.

Figure 2:
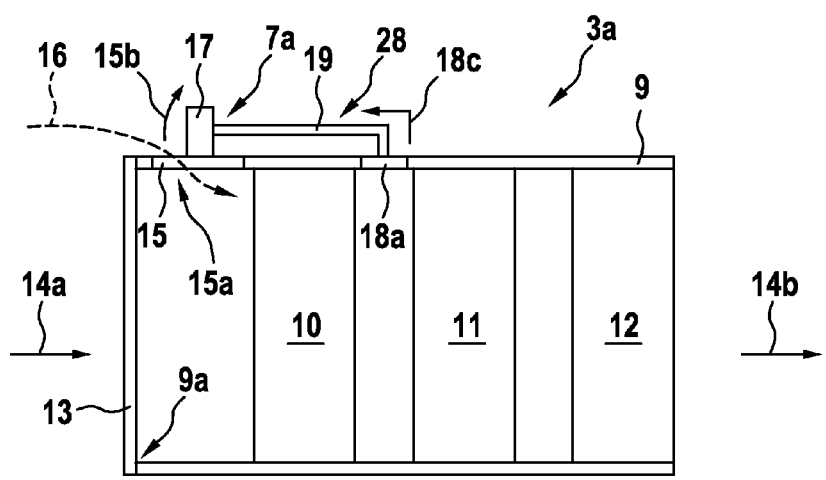
FIG. 2 shows a schematic view of a gas turbine engine with an in-line by-pass air intake device control system according to a second embodiment of the invention.

FIG. 2 shows the gas turbine engine 3a of FIG. 1 with the main air inlet opening 9a, the by-pass air intake device 7a and the bleed air outlet 18a. According to one embodiment, the gas turbine engine 3a comprises an engine housing 9 that accommodates, amongst others, an upstream rotating compressor 10 that is adapted to compress an incoming main air stream 14a, a combustion chamber 11 that is adapted to combust fuel using the main air stream 14a, and a downstream turbine 12 that is adapted to exhaust an outgoing air stream 14b.

Preferably upstream of and/or radial to the upstream rotating compressor 10, the main air inlet opening 9a and the by-pass air intake device 7a are arranged. Furthermore, downstream of the upstream rotating compressor 10, but still upstream of the combustion chamber 11, the bleed air outlet 18a is arranged.

The main air inlet opening 9a is provided with an inlet barrier filter 13, which can comprise any suitable filter material, for filtering the main air stream 14a through the main air inlet opening 9a into the gas turbine engine 3a and, more particularly, into the upstream rotating compressor 10. The by-pass air intake device 7a preferably comprises at least one by-pass air inlet opening 15a that is provided with a by-pass door 15. The latter is preferably configured to remain in closed position, if the gas turbine engine 3a is inactive, and preferentially operable by an associated operating element 17 to enable a by-pass air stream 16 through the by-pass air inlet opening 15a into the gas turbine engine 3a, if required. The bleed air outlet 18a is preferentially configured to re-route at least a comparatively small part of compressed air generated by the upstream rotating compressor 10 for creating an outgoing bleed air stream 18c that goes out of the gas turbine engine 3a in operation.

It should be noted that the above configuration of the gas turbine engine 3a as described so far is well-known to the person skilled in the art. Therefore, the gas turbine engine 3a is only illustrated roughly and schematically in FIG. 2 and not shown in greater detail.

It should further be noted that the described gas turbine engine 3a is also representative of the gas turbine engine 3b of FIG. 1. In other words, the gas turbine engine 3b of FIG. 1 is preferably configured similar to the gas turbine engine 3a, at least within predetermined manufacturing tolerances.

According to one embodiment, the associated operating element 17 that is provided for operation of the by-pass door 15 is connected to the bleed air outlet 18a by means of a by-pass air intake device control system 28. As this by-pass air intake device control system 28 interconnects the operating element 17 and the bleed air outlet 18a of the same gas turbine engine, i.e. the gas turbine engine 3a—in contrast to the crossed by-pass air intake device control system 8 of FIG. 1—, it is referred to in the present application as the "in-line by-pass air intake device control system 28", for clarity.

Preferably, the in-line by-pass air intake device control system 28 interconnects the operating element 17 and the bleed air outlet 18a of the gas turbine engine 3a such that the operating element 17 is controllable by the outgoing bleed air stream 18c that goes out of the bleed air outlet 18a in operation. In order to enable such a control by the outgoing bleed air stream 18c, the associated operating element 17 is preferentially a pneumatic actuator, such as a rod cylinder type actuator or a rotary type actuator.

According to one aspect of the invention, the in-line by-pass air intake device control system 28 comprises a connecting hose 19 that connects the bleed air outlet 18a to the operating element 17, which is configured to open or to allow opening of the by-pass door 15 in operation, e.g. in a by-pass door opening direction 15b, at least if a given clogging rate of the inlet barrier filter 13 exceeds a predetermined threshold. The in-line by-pass air intake device control system 28 may further comprise an associated air pressure accumulator (20 in FIG. 3). According to one embodiment, the by-pass door 15 is spring-loaded by an associated spring element (26 in FIG. 3) into an opened position and retained by the associated operating element 17 in operation in a closed position.

In operation of the gas turbine engine, when e.g. a given clogging rate of the inlet barrier filter 13 exceeds a predetermined threshold, pressure and streaming volume of the incoming main air stream 14 decreases and, consequently, also pressure and streaming volume of the outgoing bleed air stream 18c decreases. Thus, the associated operating element 17 cannot retain the by-pass door 15 in its closed position, so that the spring-load of the associated spring element (26 in FIG. 3) suffices to move the by-pass door 15 in the by-pass door opening direction 15b into its opened position, so that the by-pass air stream 16 can stream through the by-pass air inlet opening 15a into the gas turbine engine 3a.

Figure 3:
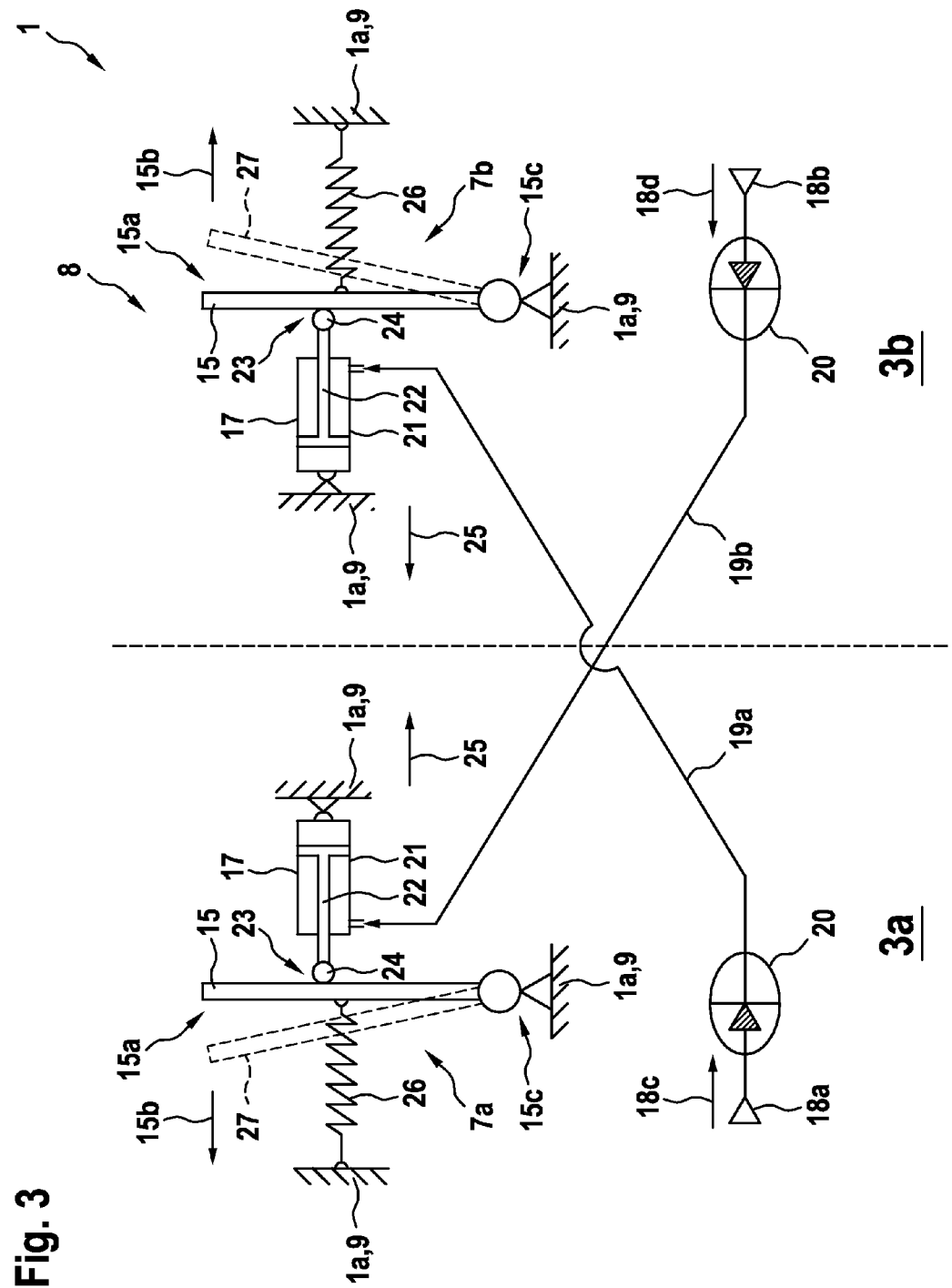
FIG. 3 shows the crossed by-pass air intake device control system of FIG. 1 in greater detail.

FIG. 3 shows the crossed by-pass air intake device control system 8 of FIG. 1 of the aircraft 1, having the two gas turbine engines 3a, 3b of FIG. 1, in greater detail. More specifically, the by-pass air intake devices 74, 7b and the bleed air outlets 18a, 18b that are interconnected as described above with reference to FIG. 1 are illustrated in greater detail.

As was mentioned above, the gas turbine engines 3a, 3b are provided with similar general configurations, at least within predetermined manufacturing tolerances. In addition, the by-pass air intake 7a, 7b of each one of the gas turbine engines 3a, 3b is provided with a by-pass door hinge element 15c, with which the respective by-pass door 15 is pivotably mounted to the engine housing 9 of the respective gas turbine engine 3a, 3b or to the fuselage 1a of the aircraft 1.

Preferably, each by-pass door 15 is connected by means of an associated piston connecting point 23 to a piston bearing 24, preferably a ball bearing, which is mounted to an actuator piston 22. The latter is glidingly housed in an actuator housing 21 of the operating element 17, which is illustratively embodied as a pneumatic actuator and, therefore, also referred to as the "pneumatic actuator 17" hereinafter, for clarity. Furthermore, each by-pass door 15 is connected to an associated spring element 26 that is configured to spring-load the by-pass door 15. Each associated spring element 26 and each actuator housing 21 is mounted to the engine housing 9 of the respective gas turbine engine 3a, 3b or to the fuselage 1a of the aircraft 1.

In the illustrated embodiment, each associated spring element 26 is mounted to the respective gas turbine engine 3a, 3b or to the fuselage 1a of the aircraft 1 such that it spring-loads the respective by-pass door 15 in the by-pass door opening direction 15b of FIG. 2 into its opened position, in which the by-pass air inlet opening 15a is opened. The by-pass door 15 in its opened position is schematically indicated in broken lines and referred to with the reference sign 27. Furthermore, each pneumatic actuator 17 is mounted to the respective gas turbine engine 3a, 3b or to the fuselage 1a of the aircraft 1 such that it pulls the respective by-pass door 15 in normal operation of the aircraft 1 in a by-pass door closing direction 25 into its closed position, in which the by-pass air inlet opening 15a is closed. Preferably, each pneumatic actuator 17 retains the respective by-pass door 15 in normal operation of the aircraft 1 in its closed position.

According to one aspect of the invention, the pneumatic actuator 17 of the gas turbine engine 3a is connected to the bleed air outlet 18b of the gas turbine engine 3b by means of a connecting hose 19b, preferably via an associated air pressure accumulator 20. Similarly, the pneumatic actuator 17 of the gas turbine engine 3b is connected to the bleed air outlet 18a of the gas turbine engine 3a by means of a connecting hose 19a, preferably also via an associated air pressure accumulator 20. Thus, the pneumatic actuator 17 of the gas turbine engine 3a is controllable by the outgoing bleed air stream 18d that goes out of the gas turbine engine 3b in operation, and the pneumatic actuator 17 of the gas turbine engine 3b is controllable by the outgoing bleed air stream 18c that goes out of the gas turbine engine 3a in operation.

More specifically, in normal operation of the aircraft 1, when both gas turbine engines 3a, 3b are active to propel the rotary wings 2a of FIG. 1, each one of the gas turbine engines 3a, 3b functions on the basis of the incoming main air stream 14a of FIG. 2. If, however, a given clogging rate of the inlet barrier filter 13 of one of the gas turbine engines 3a, 3b exceeds a predetermined threshold, the bleed air outlet 18a, 18b of this gas turbine engine 3a, 3b drives the pneumatic actuator 17 of the other one of the gas turbine engines 3b, 3a such that its by-pass door is moved to its opened position. Thus, a maximum air flow through the other one of the gas turbine engines 3b, 3a is established such that it provides a maximally available power output.

In other words, if the clogging rate of the inlet barrier filter 13 of the gas turbine engine 3b exceeds the predetermined threshold, the pneumatic actuator 17 of the gas turbine engine 3a opens the by-pass door 15 of the gas turbine engine 3a. Otherwise, if the clogging rate of the inlet barrier filter 13 of the gas turbine engine 3a exceeds the predetermined threshold, the pneumatic actuator 17 of the gas turbine engine 3b opens the by-pass door 15 of the gas turbine engine 3b.

It should be noted that the above operation is only described by way of example with respect to a clogging of an inlet barrier filter of one of the gas turbine engines 3a, 3b. However, preferably whenever an engine failure of one of the gas turbine engines 3a, 3b is detected, e.g. when the inlet barrier filter of one of the gas turbine engines 3a, 3b is getting clogged or when technical problems occur or in case of an engine fire and so on, the by-pass mechanism of the other one of the gas turbine engines 3b, 3a will immediately be activated.

It should further be noted that the constituting components of the gas turbine engines 3a, 3b shown in FIG. 3 are designated with identical reference signs for simplicity and as they convey an identical functioning. However, it should be clear to the person skilled in the art that each one of the gas turbine engines 3a, 3b comprises individual constituting components.

It should also be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. In particular, while the configurations of the gas turbine engines 3a, 3b are described as being at least similar within predetermined manufacturing tolerances, they could also be implemented differently within the spirit of the invention. E.g. while the pneumatic actuator of one of the gas turbine engines is adapted and mounted such that it pulls the respective by-pass door in normal operation to retain it in its closed position, as described above with reference to FIG. 3, the pneumatic actuator of the other one of the gas turbine engines can be adapted and mounted such that it pushes the respective by-pass door in normal operation to retain it in its closed position. Still alternatively, the pneumatic actuator of each one of the gas turbine engines can be adapted and mounted such that it pushes the respective by-pass door in normal operation to retain it in its closed position. This likewise applies to the spring element of each one of the gas turbine engines 3a, 3b.

Furthermore, a by-pass door blocking system can be provided that keeps the by-pass door of each one of the gas turbine engines 3a, 3b closed during cranking, i.e. starting of the engines. This can be useful in order to avoid foreign object damages of the gas turbine engines 3a, 3b during cranking Such a by-pass door blocking system can further be adapted to keep the by-pass door of each one of the gas turbine engines 3a, 3b closed during parking of the aircraft 1, i.e. when the gas turbine engines 3a, 3b are shut down.

Moreover, the pneumatic actuator may not only be adapted to open the by-pass door, but may further be adapted for closing it, so that an underlying pneumatic mechanism has to be convertible. In this case, the above described spring elements could advantageously be omitted. For instance, so-called double-acting cylinders in rotating or piston design that use the force of the bleed air to move in both extends and retract strokes can be used therefore. Furthermore, a multi-port-valve can be used to manage the air flow to/from the pneumatic actuator, so that the by-pass door can be opened and closed as required.

REFERENCE LIST 1 aircraft
1a fuselage
2 power consumer unit
3a, 3b aircraft engines
4 link from aircraft engines to main gearbox
5 main gearbox
6 power consumer shaft
7a, 7b by-pass air intake devices
8 crossed by-pass air intake device control system
9 engine housing
9a, 9b main air inlet openings
10 upstream rotating compressor
11 combustion chamber
12 downstream turbine
13 inlet barrier filter
14a incoming air stream
14b outgoing air stream
15 by-pass door
15a by-pass air inlet opening
15b by-pass door opening direction
15c by-pass door hinge element
16 incoming by-pass air stream
17 by-pass door actuator
18a, 18b bleed air outlets
18c, 18d bleed air streams
19, 19a, 19b connecting hoses
20 air pressure accumulators
21 by-pass door actuator housing
22 actuator piston
23 piston connecting point
24 ball bearing
25 by-pass door closing direction
26 opening springs
27 opened by-pass door
28 in-line by-pass air intake device control system

What is claimed is:

1. An engine for an aircraft, comprising a main air inlet opening, a by-pass air inlet opening and a bleed air outlet, the main air inlet opening being provided with an inlet barrier filter for filtering a main air stream through the main air inlet opening into the engine, the by-pass air inlet opening being provided with a by-pass door that is operable by an associated operating element to enable a by-pass air stream through the by-pass air inlet opening into the engine, and the bleed air outlet being provided for creating an outgoing bleed air stream going out of the engine in operation, wherein the associated operating element is connected to the bleed air outlet and controllable by the outgoing bleed air stream in operation, wherein the associated operating element is configured to open the by-pass door in operation at least if a given clogging rate of the inlet barrier filter exceeds a predetermined threshold.

2. The engine according to claim 1, wherein the associated operating element is a pneumatic actuator.

3. The engine according to claim 2, wherein the associated operating element is connected to the bleed air outlet by a connecting hose.

4. The engine according to claim 2, wherein the associated operating element is connected to the bleed air outlet via an associated air pressure accumulator.

5. The engine according to claim 2, wherein the pneumatic actuator is a rod cylinder type actuator or a rotary type actuator.

6. The engine according to claim 1, wherein the by-pass door is spring-loaded by an associated spring element into an opened position and retained by the associated operating element in operation in a closed position.

7. The engine according to claim 1, wherein the by-pass door is configured to remain in closed position, if the engine is inactive.

8. An aircraft having at least one first and one second engine wherein each of the first and second engines comprise the engine according to claim 1.

9. The aircraft according to claim 8, wherein the associated operating element of the at least one first engine is configured to open the by-pass door of the at least one first engine in operation at least if a given clogging rate of the inlet barrier filter of the at least one second engine exceeds a predetermined threshold, and the associated operating element of the at least one second engine is configured to open the by-pass door of the at least one second engine in operation at least if a given clogging rate of the inlet barrier filter of the at least one first engine exceeds a predetermined threshold.

10. The aircraft according to claim 8, wherein the associated operating element is a pneumatic actuator.

11. The aircraft according to claim 10, wherein the associated operating element of the at least one first engine is connected to the bleed air outlet of the at least one second engine by a first connecting hose, and the associated operating element of the at least one second engine is connected to the bleed air outlet of the at least one first engine by a second connecting hose.

12. The aircraft according to claim 10, wherein the associated operating element of the at least one first engine is connected to the bleed air outlet of the at least one second engine via a first associated air pressure accumulator, and the associated operating element of the at least one second engine is connected to the bleed air outlet of the at least one first engine via a second associated air pressure accumulator.

13. The aircraft according to claim 10, wherein the pneumatic actuator is a rod cylinder type actuator or a rotary type actuator.

14. The aircraft according to claim 8, wherein the by-pass door is spring-loaded by an associated spring element into an opened position and retained by the associated operating element in operation in a closed position.

15. The aircraft according to claim 8, wherein that the by-pass door is configured to remain in closed position, if the engine is inactive.

\* \* \* \* \*